United States Patent Office 3,838,172
Patented Sept. 24, 1974

3,838,172
ARYL SUBSTITUTED-HYDROXY SUBSTITUTED CYCLOHEXANECARBOXYLIC ACIDS
George Karmas, Bound Brook, N.J., assignor to Ortho Pharmaceutical Corporation
No Drawing. Original application Aug. 22, 1967, Ser. No. 662,295, now Patent No. 3,567,770. Divided and this application Sept. 23, 1970, Ser. No. 74,858
Int. Cl. C07d 7/04
U.S. Cl. 260—345.7        4 Claims

ABSTRACT OF THE DISCLOSURE

Hydroxyacids and hydroxyesters of the formula:

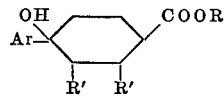

wherein R is hydrogen or lower alkyl, R' is lower alkyl and Ar is substituted aryl, are intermediates in the preparation of 2-lower alkyl-3-lower alkyl-4-aryl-cyclohexenecarboxylic acids and esters which are active agents for the suppression of animal reproduction.

---

This is a division of application Ser. No. 662,295, filed Aug. 22, 1967 and now U.S. Pat. No. 3,567,770.

The compounds of the present invention are of the formula:

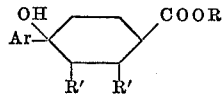

wherein R is hydrogen or lower alkyl of up to 8 carbon atoms, R' is lower alkyl of up to 6 carbon atoms and Ar is

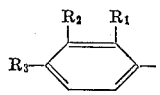

wherein $R_1$ is hydrogen, hydroxy, lower alkoxy of up to 4 carbon atoms, lower acyloxy of up to 5 carbon atoms or tetrahydropyranyl-2-oxy, $R_2$ is hydrogen, hydroxy, lower alkyl of up to 4 carbon atoms, lower alkoxy of up to 4 carbon atoms, lower acyloxy of up to 5 carbon atoms, chlorine, tetrahydropyranyl-2-oxy or trifluoromethyl and $R_3$ is hydrogen, hydroxy, lower alkyl of up to 4 carbon atoms, lower acyloxy of up to 5 carbon atoms, diethylaminoethoxy, thiomethyl, trifluoromethyl, dimethylamino or tetrahydropyranyl-2-oxy, and wherein at least 1 and not more than 2 of $R_1$, $R_2$ and $R_3$ is hydrogen; 3,4-methylenedioxyphenyl, α-naphthyl or β-naphthyl.

The compounds of the present invention are prepared by the saponification of their corresponding lactones or by the reaction of aryl Grignard reagent or an aryl lithium compound and a 2-lower alkyl-3-lower alkyl-4-ketocyclohexanecarboxylic acid. The preparation of the lactones is disclosed in my copending application Ser. No. 662,282 filed Aug. 22, 1967 and now abandoned. The utility of the 2-lower alkyl-3-lower alkyl-4-aryl-cyclohexenecarboxylic acids and esters prepared from the compounds of the present invention is fully described in my copending application Ser. No. 622,311, filed Aug. 22, 1967 and now abandoned.

The preparation of the compounds of the invention is illustrated by the following reaction schemes:

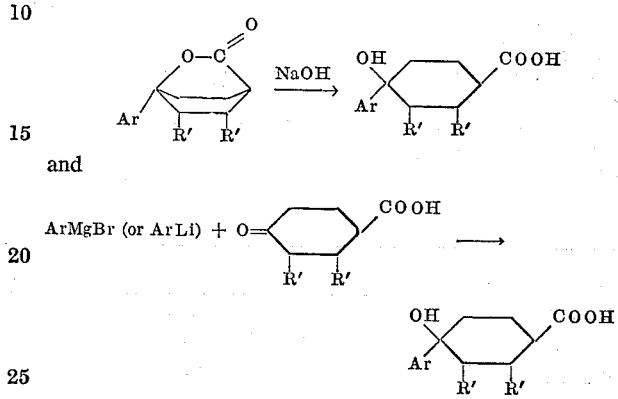

The compounds of the invention are used to prepare the final 2-lower alkyl-3-lower alkyl-4-aryl-cyclohexenecarboxylic acids and esters according to the following reaction scheme:

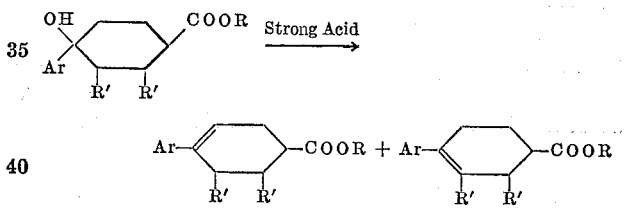

Typical lactone starting materials for the compounds of the present invention are the lactones of:

2-methyl-3-ethyl-4-hydroxy-4-(m-anisyl)cyclohexanecarboxylic acid,
2,3-dimethyl-4-hydroxy-4-(m-anisyl)cyclohexanecarboxylic acid,
2,3-diethyl-4-hydroxy-4-(m-anisyl)cyclohexanecarboxylic acid,
2-methyl-3-propyl-4-hydroxy-4-(m-anisyl)cyclohexanecarboxylic acid,
2-propyl-3-butyl-4-hydroxy-4-(m-anisyl)cyclohexanecarboxylic acid,
2,3-dimethyl-4-hydroxy-4-(m-tetrahydropyranyloxyphenyl)cyclohexanecarboxylic acid,
2,3-diethyl-4-hydroxy-4-(m-tetrahydropyranyloxyphenyl)cyclohexanecarboxylic acid,
2-ethyl-3-butyl-4-hydroxy-4-(3,4-methylenedioxyphenyl) cyclohexanecarboxylic acid,
2,3-diethyl-4-hydroxy-4-(p-trifluoromethylphenyl) cyclohexanecarboxylic acid,
2,3-dibutyl-4-hydroxy-4-(m-trifluoromethylphenyl) cyclohexanecarboxylic acid, 2-methyl-3-propyl-4-hydroxy-4-(o-methoxy-p-acetoxyphenyl)cyclohexanecarboxylic acid,
2-methyl-3-butyl-4-hydroxy-4-(o,p-diacetoxyphenyl)cyclohexanecarboxylic acid, The following examples illustrate the preparation of the compounds of the invention.

EXAMPLE I 2-methyl-3-ethyl-4-hydroxy-4-(m-anisyl)cyclohexanecarboxylic acid

A mixture of 10.0 g. of the lactone of 2-methyl-3-ethyl-4-hydroxy-4-(m-anisyl)cyclohexanecarboxylic acid, 10.0 g. of sodium hydroxide, 100 ml. of methanol and 100 ml. of water is stirred and refluxed for two hours and is then diluted with 250 ml. of water and evaporated to remove the methanol. The solution is acidified with dilute hydrochloric acid, and is extracted with ether. The ether solution is rapidly washed with water, dried over anhydrous magnesium sulfate and filtered. The residue is recrystallized from ether to afford 2-methyl-3-ethyl-4-hydroxy-4-(m-anisyl)cyclohexanecarboxylic acid; m.p. 203–204° C.

$\lambda\lambda_{max}$: 2.83, 5.87 and 5.94 (split), 7.78, 8.03, 10.23, 12.80, 14.27$\mu$ (KBr).

NMR (pyr.): 0.63, 0.75, 0.87; 1.46, 1.57; 2.96.

Following the procedure of Example I, but starting with the appropriate lactone, there are prepared:

EXAMPLE XV 2-methyl - 3 - ethyl-4-hydroxy-4-(o-tetrahydropyranyloxyphenyl)cyclohexanecarboxylic acid; m.p. 164–166° C.

$\lambda\lambda_{max}$: 2.88, 5.87, 8.13, 10.24, 10.85, 11.52, 13.28$\mu$ (KBr).

NMR (pyr.): 0.67, 0.79, 0.90; 1.47, 1.58; 2.97.

EXAMPLE XVI 2-methyl - 3 - ethyl-4-hydroxy-4-(o-methoxy-p-tetrahydropyranyloxyphenyl)cyclohexanecarboxylic acid, m.p. 118–130° C.

$\lambda\lambda_{max}$: 2.86, 5.87, 8.31, 9.62, 10.10, 11.04, 11.92$\mu$ (KBr).

NMR (pyr.): 0.65, 0.76, 0.88; 1.46, 1.57; 2.93.
NMR (CDCl$_3$): 0.67, 0.78, 0.89; 1.02, 1.13; 1.82, 2.57.

EXAMPLE XVII 2-methyl - 3 - ethyl - 4 - hydroxy-(o,p-bis-tetrahydropyranyloxyphenyl)cyclohexanecarboxylic acid, m.p. 100–108° C.

$\lambda\lambda_{max}$: 2.88, 5.87, 7.99, 9.61, 9.97, 10.38, 10.95, 11.85$\mu$ (KBr).

NMR (pyr.): 0.73, 0.85, 0.96; 1.52, 1.63; 2.98.

Calcd. for C$_{26}$H$_{38}$O$_7$: C, 67.51; H, 8.28. Found: C, 67.00; H, 8.33.

| Example | Compound formed | M.P., °C. | U.V., max. (KBr) |
|---|---|---|---|
| II | 2-methyl-3-ethyl-4-hydroxy-4-(o-anisyl)-cyclohexanecarboxylic acid. | 187–188 | 2.82, 5.87 and 5.97 (split), 7.74, 8.10, 9.67, 13.20$\mu$. |
| III | 2-methyl-3-ethyl-4-hydroxy-4-(p-thioanisyl)-cyclohexanecarboxylic acid. | 189–190 | 2.83, 5.90, 7.99, 10.37, 11.00, 12.29$\mu$. |
| IV | 2-methyl-3-ethyl-4-hydroxy-4-(p-tolyl)cyclohexanecarboxylic acid. | 201–202 | 2.82, 5.90, 8.10, 10.32, 12.27, 14.10$\mu$. |
| V | 2-methyl-3-ethyl-4-hydroxy-4-(m-tolyl)cyclohexanecarboxylic acid. | 154–155 | 2.82, 5.89, 8.01, 8.40, 9.60, 12.78, 13.62$\mu$. |
| VI | 2-methyl-3-ethyl-4-hydroxy-4-(p-trifluoromethylphenyl)cyclohexanecarboxylic acid. | 200–201 | 2.83, 5.87 and 5.98 (split), 7.50, 8.92, 9.30, 11.81, 12.02$\mu$. |
| VII | 2-methyl-3-ethyl-4-hydroxy-4-(m-trifluoromethylphenyl)cyclohexanecarboxylic acid. | 160–170 | 2.85, 5.83 and 5.97 (split), 7.50, 8.60, 8.92, 12.48, 14.22, 14.49$\mu$. |
| VIII | 2-methyl-3-ethyl-4-hydroxy-4-(3,4-methylenedioxyphenyl)cyclohexanecarboxylic acid. | 196–197 | 2.82, 5.86 and 5.94 (split), 8.00, 9.60, 10.63, 12.35$\mu$. |
| IX | 2-methyl-3-ethyl-4-hydroxy-4-($\alpha$-naphthyl)-cyclohexanecarboxylic acid. | 177–178 | 2.82, 5.87 and 5.95 (split), 7.70, 10.13, 11.60, 12.47, 12.89$\mu$. |
| X | 2-methyl-3-ethyl-4-hydroxy-4-($\beta$-naphthyl)-cyclohexanecarboxylic acid. | 216–217 | 2.85, 5.90, 8.00, 8.58, 11.67, 12.20, 13.33$\mu$. |
| XI | 2-methyl-3-ethyl-4-hydroxy-4-($\alpha$-thienyl)-cyclohexanecarboxylic acid. | 164–166 | 2.83, 5.88, 8.02, 9.62, 10.10, 11.79, 14.15, 14.33$\mu$. |
| XII | 2-methyl-3-ethyl-4-hydroxy-4-benzylcyclohexanecarboxylic acid. | 142–143 | 2.88, 5.84, 8.23, 10.14, 11.51, 13.03, 14.15$\mu$. |
| XIII | 2-methyl-3-propyl-4-(p-anisyl)cyclohexanecarboxylic acid. | 196–197 | 2.84, 5.90, 7.99, 9.57, 11.90, 12.35$\mu$. |

EXAMPLE XIV 2-methyl-3-ethyl-4-hydroxy-4-(m-tetrahydropyranyloxyphenyl)cyclohexanecarboxylic acid A mixture of 10.0 g. of the lactone of 2-methyl-3-ethyl-4 - hydroxy - 4 - (m-tetrahydropyranyloxyphenyl)cyclohexanecarboxylic acid, 10.0 g. of sodium hydroxide, 100 ml. of methanol and 100 ml. of water is stirred and refluxed for two hours. It is then diluted with 250 ml. of water and evaporated to remove methanol. The insoluble oily material is removed by extraction with ether and is discarded. 200 ml. of methylene chloride is added to the solution and the mixture is stirred and is maintained at 0–5° C. while making the mixture barely acidic with cold dilute hydrochloric acid. The methylene chloride phase is separated, washed twice with brine, dried over anhydrous magnesium sulfate and evaporated to a residue. The residue is recrystallized from ether to afford 2-methyl-3-ethyl - 4 - hydroxy-4-(m-tetrahydropyranyloxyphenyl)cyclohexanecarboxylic acid, m.p. 149–151° C.

$\lambda\lambda_{max}$: 2.83, 5.88, 8.02, 8.98, 9.61, 10.34, 10.92$\mu$ (KBr).
NMR (pyr.): 0.62, 0.73, 0.85; 1.46, 1.58; 2.95.

Following the procedure of Example XIV, there are prepared:

EXAMPLE XVIII 2-methyl-3-ethyl-4-hydroxy-4-(m-hydroxyphenyl)-cyclohexanecarboxylic acid A suspension of 10.0 g. of 2-methyl-3-ethyl-4-hydroxy-4 - (m - tetrahydropyranyloxyphenyl)cyclohexanecarboxylic acid (as prepared in Example XIV) in 260 ml. of methanol containing 35 ml. of water and 1.5 ml. of 12N hydrochloric acid is stirred at 25° C. for forty minutes. To the resulting clear solution is added 260 ml. of water and 5 ml. of pyridine and the solution is evaporated to remove methanol while precipitating the phenolic hydroxy acid. The mixture is acidified with dilute hydrochloric acid and the product is extracted with ether. The ether solution is washed twice with water, dried over anhydrous magnesium sulfate and evaporated to dryness. The residue is recrystallized from ether-methylene chloride to afford 2-methyl-3-ethyl-4-hydroxy-4-(m-hydroxyphenyl)cyclohexanecarboxylic acid, m.p. 211–213° C.

$\lambda\lambda_{max}$: 2.96, 3.15, 5.78, 7.50, 9.60, 10.26, 12.68, 13.31, 14.23$\mu$ (KBr).

NMR (pyr.): 0.63, 0.74, 0.85; 1.45, 1.57; 2.92.

EXAMPLE XIX 2-methyl-3-ethyl-4-hydroxy-4-(o-hydroxyphenyl)-cyclohexanecarboxylic acid Following the procedure of Example XVIII, but starting with 2-methyl-3-ethyl-4-hydroxy - 4 - (o-tetrahydropyranyloxyphenyl)cyclohexanecarboxylic acid (as prepared in Example XV), there is afforded 2-methyl-3-ethyl-4-hydroxy - 4 - (o-hydroxyphenyl)cyclohexanecarboxylic acid, m.p. 190–191° C.

$\lambda\lambda_{max}$: 2.82, 3.04, 5.90, 8.06, 10.40, 10.69, 10.92, 13.23$\mu$ (KBr).

NMR (pyr.): 0.67, 0.78, 0.89; 1.42, 1.53; 2.96.

EXAMPLE XX 2-methyl-3-ethyl-4-hydroxy-4-(o,p-dihydroxyphenyl)-cyclohexanecarboxylic acid Following the procedure of Example XVIII, but starting with 2-methyl-3-ethyl-4-hydroxy - 4 - (o,p-bis-tetrahydropyranyloxyphenyl)cyclohexanecarboxylic acid (as prepared in Example XVII), there is afforded 2-methyl-3-ethyl-4-(o,p - dihydroxyphenyl)cyclohexanecarboxylic acid, m.p. 169–171° C.

$\lambda\lambda_{max}$: 2.85, 2.95, 3.12, 5.90, 8.62, 8.89, 10.21, 11.81, 12.10, 12.42$\mu$ (KBr).

NMR (pyr.): 0.72, 0.82, 0.93; 1.40, 1.52; 2.92.

EXAMPLE XXI 2-methyl-3-ethyl-4-hydroxy-4-(o-methoxy-p-hydroxy-phenylcyclohexanecarboxylic acid Following the procedure of Example XVIII, but starting with 2-methyl-3-ethyl-4-hydroxy - 4 - (o-methoxy-p-tetrahydropyranyloxyphenyl)cyclohexanecarboxylic acid (as prepared in Example XVI), there is afforded 2-methyl-3-ethyl-4-hydroxy - 4 - (o-methoxy-p-hydroxyphenyl)cyclohexanecarboxylic acid, m.p. 128–131° C.

$\lambda\lambda_{max}$: 2.95, 5.88, 8.31, 9.65, 10.33, 11.97$\mu$ (KBr).

NMR (pyr.): 0.67, 0.78, 0.90; 1.46, 1.57; 2.94.

EXAMPLE XXII 2-methyl-3-ethyl-4-hydroxy-4-(m-acetoxyphenyl) cyclohexanecarboxylic acid To a solution of 2.0 g. of 2-methyl-3-ethyl-4-hydroxy-4-(m-hydroxyphenyl)cyclohexanecarboxylic acid (as prepared in Example XVIII), in 25 ml. of pyridine is added with stirring 3 ml. of acetic anhydride. The solution is maintained at 25° C. for twenty hours and is then hydrolyzed with ice and water. The oily products are extracted with ether. The ether solution is washed with cold dilute hydrochloric acid to remove pyridine and is then extracted with three cold portions of 7% aqueous potassium carbonate with each successive carbonate wash being immediately acidified with dilute hydrochloric acid. A tacky precipitate from the carbonate solutions is extracted with ether and the combined ether solution is dried and evaporated at 25° C. The residue is recrystallized from ether to afford 2-methyl-3-ethyl-4-hydroxy-4-(m - acetoxyphenyl)cyclohexanecarboxylic acid, m.p. 172–173° C.

$\lambda\lambda_{max}$: 2.83, 5.68, 8.30, 9.63, 10.71, 12.73$\mu$ (KBr).

NMR (pyr.): 0.61, 0.71, 0.82; 1.44, 1.55; 2.94.

EXAMPLE XXIII 2-methyl-3-ethyl-4-hydroxy-4-(o-acetoxyphenyl)-cyclohexanecarboxylic acid Following the procedure of Example XXII, but starting with 2-methyl-3-ethyl-4-hydroxy-4-(o - hydroxyphenyl)cyclohexanecarboxylic acid (as prepared in Example XIX), there is afforded 2-methyl-3-ethyl-4-hydroxy-4-(o-acetoxyphenyl)cyclohexanecarboxylic acid, m.p. 132–133° C.

$\lambda\lambda_{max}$: 2.82, 5.72, 5.89, 8.20, 8.48, 13.09$\mu$ (KBr).

NMR (pyr.): 0.68, 0.80, 0.91; 1.43, 1.55; 2.96.

EXAMPLE XXIV 2-methyl-3-ethyl-4-hydroxy-4-(o,p-diacetoxyphenyl) cyclohexanecarboxylic acid Following the procedure of Example XXII, but starting with 2-methyl-3-ethyl-4-hydroxy - 4 - (o,p-dihydroxyphenyl)cyclohexanecarboxylic acid (as prepared in Example XX), there is afforded 2-methyl-3-ethyl-4-hydroxy-4-(o,p-diacetoxyphenyl)cyclohexanecarboxylic acid, m.p. 110–112° C.

$\lambda\lambda_{max}$: 2.85, 5.68, 8.10–8.40, 9.80, 10.87$\mu$ (KBr).

NMR (CDCl$_3$): 0.64, 0.75, 0.86; 0.99, 1.10; 1.89, 2.59.

The o-acetoxyphenyl-hydroxy acids prepared according to Examples XXIII and XXIV are unstable and begin to decompose after a few days at 25° C. They are fully decomposed within two to three weeks at 25° C. The decomposition follows the route:

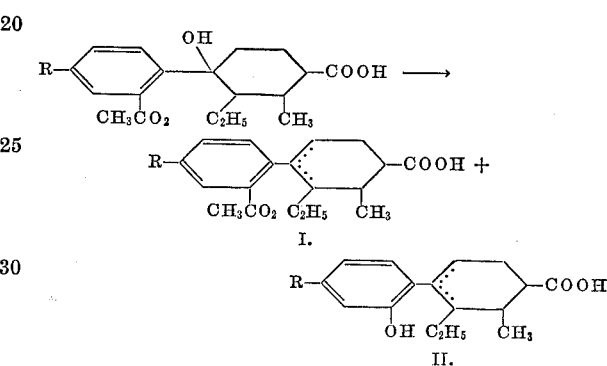

Compounds I and II are mixtures of the $\Delta^3$ and $\Delta^4$ isomers.

EXAMPLE XXV 2-methyl-3-ethyl-4-hydroxy-4-(m-chlorophenyl)cyclohexanecarboxylic acid The Grignard reagent from 0.32 mole of m-chlorobromobenzene, prepared in a mixture of ether and tetrahydrofuran, is stirred at —40° and to it is added 0.1 mole of 2-methyl-3-ethyl-4-ketocyclohexanecarboxylic acid in 40 ml. of tetrahydrofuran. This reaction mixture is stirred vigorously and heated at the reflux temperature for two hours and then it is cooled in ice and hydrolyzed with 400 ml. of saturated aqueous ammonium acetate. After filtration to remove magnesium, the layers are separated and the organic phase is dried and evaporated to a tacky, semicrystalline residue. Recrystallization from ether or nitromethane affords 9.0 g. of 2-methyl-3-ethyl-4-hydroxy-4-(m-chlorophenyl)cyclohexanecarboxylic acid, m.p. 166–169° C.

$\lambda\lambda_{max}$: 2.83, 5.89, 8.01, 12.77, 1379$\mu$ (KBr).

NMR (pyr.): 0.59, 0.70, 0.80; 1.40, 1.52; 2.92.

The alkyl esters of the compounds of the invention are prepared by treatment of metal salts of the hydroxyacids with an appropriate dialkyl sulfate.

EXAMPLE XXVI

Methyl 2-methyl-3-ethyl-4-hydroxy-4-phenylcyclohexanecarboxylate

A solution of 4.0 g. of 2-methyl-3-ethyl-4-hydroxy-4-phenylcyclohexanecarboxylic acid and 1.5 g. of sodium hydroxide in 40 ml. of methanol and 150 ml. of dimethylformamide is evaporated under vacuum to a volume of 100 ml. The resulting suspension is stirred and cooled to 15° C. 3.5 ml. of dimethyl sulfate is added and the mixture is stirred at 25° C. for thirty minutes and is then evaporated under vacuum to remove most of the dimethylformamide. The residue of about 15-20 ml. of shaken with ether and water, and the ether solution is washed with cold 5% sodium hydroxide, followed by four portions of water. The ether solution is dried and evaporated to a residue. The residue is recrystallized from hexane to afford methyl 2-methyl-3-ethyl-4-hydroxy-4-phenylcyclohexanecarboxylate, m.p. 112-113° C.

$\lambda\lambda_{max}$: 2.87, 5.79, 8.21, 8.55, 13.29, 14.30$\mu$ (KBr).

Calcd. for $C_{17}H_{24}O_3$: C, 73.88; H, 8.75. Found: C, 74.00; 8.76.

EXAMPLE XXVII

Methyl 2-methyl-3-ethyl-4-hydroxy-4-(p-trifluoromethylphenyl)cyclohexanecarboxylate Following the procedure of Example XXVI, but starting with 2-methyl-3-ethyl-4-hydroxy-4-(p-trifluoromethylphenyl)cyclohexanecarboxylic acid, there is afforded methyl 2-methyl-3-ethyl-4-hydroxy - 4 - (p - trifluoromethylphenyl)cyclohexanecarboxylate, m.p. 112-113° C.

$\lambda\lambda_{max}$: 2.89, 5.88, 7.49, 7.82, 8.61, 8.90, 9.29, 9.84, 11.81, 12.04$\mu$ (KBr).

Calcd. for $C_{18}H_{23}O_3F_3$: C, 62.79; H, 6.73. Found: C, 63.07; H, 6.73.

EXAMPLE XXVIII

Methyl 2-methyl-3-ethyl-4-hydroxy-4-(m-trifluoromethylphenyl)cyclohexanecarboxylate Following the procedure of Example XXVI, but starting with 2-methyl-3-ethyl-4-hydroxy-4-(m-trifluoromethylphenyl)cyclohexanecarboxylic acid, there is afforded methyl 2-methyl-3-ethyl-4-hydroxy-4-(m - trifluoromethylphenyl)cyclohexanecarboxylate, m.p. 122-124° C.

$\lambda\lambda_{max}$: 2.87, 5.80, 7.50, 8.61, 8.87, 9.24, 12.50, 14.17$\mu$ (KBr).

Calcd. for $C_{18}H_{33}O_3F_3$: C, 62.79; H, 6.73. Found: C, 62.67; H, 6.73.

Following the procedure of Example XXVI by the selection of the appropriate hydroxy acid and dialkyl sulfate, there are prepared:

ethyl 2-methyl-3-ethyl-4-hydroxy-4-benzylcyclohexanecarboxylate,
propyl 2-methyl-3-propyl-4-hydroxy-4-benzylcyclohexanecarboxylate,
ethyl 2-ethyl-3-methyl-4-hydroxy-4-benzylcyclohexanecarboxylate,
ethyl 2,3-dimethyl-4-hydroxy-4-benzylcyclohexanecarboxylate,
ethyl 2,3-diethyl-4-hydroxy-4-benzylcyclohexanecarboxylate,
butyl 2-methyl-3-ethyl-4-hydroxy-4-benzylcyclohexanecarboxylate,
butyl 2-ethyl-3-butyl-4-hydroxy-4-benzylcyclohexanecarboxylate,
butyl 2-methyl-3-ethyl-4-hydroxy-4-(m-tolyl)cyclohexanecarboxylate, and
butyl 2-methyl-3-propyl-4-hydroxy-4-(m-tolyl)cyclohexanecarboxylate.

EXAMPLE XXIX 4-bromoresorcinol bis-tetrahydropyranyl ether

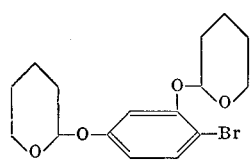

To a solution of 100 g. of 4-bromoresorcinol and 70 ml. of dihydropyran in 300 ml. of ether is added 2 ml. of 1.4 N solution of ethereal hydrogen chloride. The temperature of the reaction mixture is maintained at 25-32° for 20 hours and then the solution is washed with cold 5% aqueous sodium hydroxide until the washings are colorless. After drying with anhydrous potassium carbonate, the ether solution is evaporated and the viscous oily residue is recrystallized from hexane to afford 112 g. 4-bromoresorcinol bis-tetrahydropyranyl ether, m.p. 60-65°. A further-recrystallized, analytical sample melted at 68-69°.

$\lambda\lambda_{max}$: 8.48, 8.90-9.00, 9.62, 10.00, 11.03$\mu$ (KBr).

Calcd. for $C_{16}H_{21}BrO_4$: C, 53.80; H, 5.92. Found: C, 53.94; H, 5.97.

EXAMPLE XXX 3-methoxy-4-bromophenol tetrahydropyranyl ether

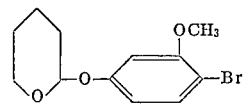

The combined aqueous alkaline wash from the reaction products of 4-bromoresorcinol with dihydropyran (above) is layered with 300 ml. of ether, stirred and maintained at 0-5°, and acidified with cold dilute hydrochloric acid. The ether solution is washed twice with aqueous potassium bicarbonate, dried, and evaporated to a crystalline residue which is recrystallized from ether-hexane to afford 36 g. of 4-bromoresorcinol 1-tetrahydropyranyl ether, m.p. 72-74°.

$\lambda\lambda_{max}$: 2.99, 8.35, 10.11, 10.35, 10.95, 12.47$\mu$ (KBr).

Calcd. for $C_{11}H_{13}BrO_3$: C, 48.33; H, 4.79. Found: C, 48.57; H, 4.64.

A solution of 35 g. of 4-bromoresorcinol 1-tetrahydropyranyl ether (above) and 8.0 g. of sodium hydroxide in 200 ml. of water and 500 ml. of dimethylformamide is evaporated to a volume of 300 ml. To this is added 13.5 ml. of dimethyl sulfate and the mixture is stirred at 25-30° for thirty minutes and then diluted with 600 ml. of 3% aqueous sodium hydroxide. Two extractions with ether are made and then the combined ether solution is washed five times with water to remove dimethylformamide. After drying and evaporation, the ether residue is distilled to afford 35 g. of 3-methoxy-4-bromophenol tetrahydropyranyl ether, a colorless oil of b.p. 120-125° at 0.001 mm.

$\lambda\lambda_{max}$: 8.31, 8.55, 9.49, 9.75, 10.10-10.20, 11.04$\mu$.

Calcd. for $C_{12}H_{15}BrO_3$: C, 50.18; H, 5.26. Found: C, 49.96; H, 5.17.

The Grignard reagent is prepared under nitrogen from 0.14 mole of the appropriately substituted aryl halide or aralkyl halide and 15 g. of magnesium in 120 ml. of ether and 120 ml. of tetrahydrofuran.

EXAMPLE XXXI

Lactone of 2-methyl-3-ethyl-4-hydroxy-4-phenyl cyclohexanecarboxylic acid 0.12 mole of phenyl magnesium bromide in ether-tetrahydrofuran is stirred vigorously and maintained at −30° C. while a solution of 0.1 mole of ethyl 2-methyl-3-ethyl-4-ketocyclohexanecarboxylate in 30 ml. of tetrahydrofuran is added over a period of 10 minutes. This mixture is permitted to warm to room temperature. It is then stirred and refluxed for three hours, and is then chilled in an ice and water bath and hydrolyzed by the addition of 200 ml. of saturated aqueous ammonium acetate. The excess magnesium is filtered off, washing with 200 ml. of ether, and the filtrate layers are separated. The ether phase is washed with water and 7% aqueous potassium carbonate, and is dried over anhydrous magnesium sulfate. It is evaporated under vacuum leaving an oily residue. The oily residue is heated to 120° C. under a pressure of 0.001 mm. to remove volatiles. The residue is then chromatographed on a column of neutral alumina, and elution with benzene and ether affords a series of lactonic fractions. Those possessing similar infrared spectra are combined and recrystallized from hexane to afford the lactone of 2-methyl-3-ethyl-4-hydroxy-4-phenyl-cyclohexanecarboxylic acid, m.p. 82–83° C. having the infrared spectrum:

$\lambda\lambda_{max}$: 5.71, 8.05, 9.11, 9.84, 10.79, 13.05μ (KBr).

Calcd. for $C_{16}H_{20}O_2$: C, 78.65; H, 8.25. Found: C, 78.63; H, 8.03.

The steric structure is confirmed with NMR as follows:
NMR ($CDCl_3$): 0.61, 0.72, 0.83; 1.08; 1.19; 2.00; 2.53.

Following the procedure of Example XXXI there are prepared:

| Example | Compound formed lactone of— | Ar in ArMgBr | M.P., ° C. | Infrared spectra $\lambda\lambda_{max}$ |
|---|---|---|---|---|
| I | 2-methyl-3-ethyl-4-hydroxy-4-(m-anisyl)-cyclohexanecarboxylic acid. | m-Anisyl | 104–105 | 5.71, 8.13, 9.14, 9.73, 9.81, 11.18, 12.74 μ. (KBr) |
| XXXII | 2-methyl-3-ethyl-4-hydroxy-4-(o-anisyl)-cyclohexanecarboxylic acid. | o-Anisyl | Impure oil | 5.70, 8.04, 9.71, 9.89, 13.21 μ. |
| XXXIV | 2-methyl-3-ethyl-4-hydroxy-4-(p-diethylaminoethoxyphenyl)cyclohexanecarboxylic acid. | p-Diethylaminoethoxyphenyl | B.P. at 0.001 mm. 180–190. | 5.70, 8.00, 8.45, 9.14, 9.86, 12.00 μ. |
| XXXV | 2-methyl-3-ethyl-4-hydroxy-4-(p-thioanisyl)-cyclohexanecarboxylic acid. | p-Thioanisyl | 91–92 | 5.71, 9.13, 9.83, 11.97, 12.70 μ. (KBr) |
| XXXVI | 2-methyl-3-ethyl-4-hydroxy-4-(p-tolyl)-cyclohexanecarboxylic acid. | p-Tolyl | 96–97 | 5.73, 8.36, 9.12, 9.86, 12.26 μ. (KBr) |
| XXXVII | 2-methyl-3-ethyl-4-hydroxy-4-(m-tolyl)-cyclohexanecarboxylic acid. | m-Tolyl | 117–118 | 5.72, 8.01, 9.16, 9.83, 12.55, 12.73 μ. (KBr) |
| XXXVIII | 2-methyl-3-ethyl-4-hydroxy-4-(m-tetrahydropyranyloxyphenyl)cyclohexanecarboxylic acid. | m-Tetrahydropyranyloxyphenyl. | 98–112 | 5.70, 8.48, 9.86, 10.31, 12.64, 12.72 μ. (KBr) |
| XXXIX | 2-methyl-3-ethyl-4-hydroxy-4-(o-tetrahydropyranyloxyphenyl)cyclohexanecarboxylic acid. | o-Tetrahydropyranyloxyphenyl. | 93–98 | 5.70, 8.10, 9.89, 10.37, 10.87, 11.47, 13.29 μ. (KBr) |
| XL | 2-methyl-3-ethyl-4-hydroxy-4-(o-methoxy-p-tetrahydropyranyloxyphenyl)cyclohexanecarboxylic acid. | o-Methoxy-p-tetrahydropyranyloxyphenyl. | Impure oil | 5.70, 7.83, 8.32, 9.60, 9.87, 10.16, 11.01 μ. |
| XLI | 2-methyl-3-ethyl-4-hydroxy-4-(o,p-bis-tetrahydropyranyloxyphenyl)cyclohexanecarboxylic acid. | o,p-Bis-tetrahydropyranyloxyphenyl. | do | 5.69, 7.90, 8.50, 9.60, 11.07, 11.42 μ. |
| XLII | 2-methyl-3-ethyl-4-hydroxy-4-(3,4-methylenedioxyphenyl)cyclohexanecarboxylic acid. | 3,4-methylenedioxyphenyl | 132–133 | 5.72, 8.10, 9.12, 9.65, 9.82, 10.77, 12.25 μ. (KBr) |
| XLIII | 2-methyl-3-ethyl-4-hydroxy-4-(α-naphthyl)-cyclohexanecarboxylic acid. | α-Naphthyl | Impure oil | 5.71, 8.25, 8.94, 9.60, 9.90, 12.42, 12.82 μ. |

What is claimed is:

1. 2-methyl-3-ethyl-4-hydroxy-4-(m-tetrahydropyranyloxyphenyl)cyclohexanecarboxylic acid.

2. 2-methyl-3-ethyl-4-hydroxy-4-(o - tetrahydropyranyloxyphenyl)cyclohexanecarboxylic acid.

3. 2-methyl-3-ethyl - 4 - hydroxy-4-(o-methoxy-p-tetrahydropyranyloxyphenyl)cyclohexanecarboxylic acid.

4. 2-methyl-3-ethyl - 4 - hydroxy-4-(o,p-bis-tetrahydropyranyloxyphenyl)cyclohexanecarboxylic acid.

No references cited.

NORMA S. MILESTONE, Primary Examiner

UNITED STATES PATENT OFFICE
CERTIFICATE OF CORRECTION

Patent No. 3,838,172　　　　　　　　　Dated September 24, 1974

Inventor(s) Karmas, George　　　　　　　　　Page 1

It is certified that error appears in the above-identified patent and that said Letters Patent are hereby corrected as shown below:

In Column 1, line 4- in title, the word "Cyclohexanecarboxylic" should read --- Cyclohexenecarboxylic ---.

In Column 1, line 63, the words "of aryl" should read --- of an aryl ---.

In Column 2, line 5, the words "Serial No. 622,311" should read --- Serial No. 662,311 ---.

In Column 4, line 67, the word "wifh" should read --- with ---.

In Column 6, line 57, the number "1379" should read 13.79 ---.

In Column 7, line 10, the numbers "74.00; 8.76" should read 74.00; H, 8.76 ---.

In Column 8, line 1, the number "1.4 N" should read --- a 1:4 N ---.

UNITED STATES PATENT OFFICE
CERTIFICATE OF CORRECTION

Patent No. 3,838,172                               Dated September 24, 1974

Inventor(s) Karmas, George                                  Page 2

It is certified that error appears in the above-identified patent and that said Letters Patent are hereby corrected as shown below:

Column 9, (in table) the first two examples, in column 1 should appear as shown below:

| XXII... | 2-methyl-3-ethyl-4-hydroxy-4-(m-anisyl)-cyclohexanecarboxylic acid |
| XXXIII. | 2-methyl-3-ethyl-4-hydroxy-4-(o-anisyl)-cyclohexanecarboxylic acid |

In Column 10, (in table) Example XLI, under "infrared spectra $\lambda\lambda$ max" "11.07, $\mu$" should read -- 11.07, --.

Signed and Sealed this eighteenth Day of November 1975

[SEAL]

Attest:

RUTH C. MASON
Attesting Officer

C. MARSHALL DANN
Commissioner of Patents and Trademarks